(12) United States Patent
Otsubo

(10) Patent No.: US 7,194,818 B2
(45) Date of Patent: Mar. 27, 2007

(54) MOUNT TABLE, SURFACE TEXTURE MEASURING MACHINE AND SURFACE TEXTURE MEASURING METHOD

(75) Inventor: Seiichi Otsubo, Utsunomiya (JP)

(73) Assignee: Mitutoyo Corporation, Kawasaki (JP)

( * ) Notice: Subject to any disclaimer, the term of this patent is extended or adjusted under 35 U.S.C. 154(b) by 46 days.

(21) Appl. No.: 11/099,251

(22) Filed: Apr. 5, 2005

(65) Prior Publication Data

US 2005/0223579 A1 Oct. 13, 2005

(30) Foreign Application Priority Data

Apr. 8, 2004 (JP) ............................. 2004-113933

(51) Int. Cl.
*G01B 21/04* (2006.01)

(52) U.S. Cl. .............................. 33/502; 33/549; 33/503

(58) Field of Classification Search .................. 33/502, 33/503, 504, 505, 549, 550, 551, 552, 553, 33/554, 555, 568, 573, DIG. 2; 269/20; 414/676; 73/1.79, 1.81
See application file for complete search history.

(56) References Cited

U.S. PATENT DOCUMENTS

| | | | | |
|---|---|---|---|---|
| 3,253,665 A | * | 5/1966 | Schienle | 180/164 |
| 3,795,054 A | * | 3/1974 | Kinney | 33/505 |
| 4,369,581 A | * | 1/1983 | Lenz | 33/1 M |
| 4,417,843 A | * | 11/1983 | Bonga | 414/676 |
| 4,819,339 A | * | 4/1989 | Kunzmann et al. | 33/503 |
| 4,887,904 A | * | 12/1989 | Nakazato et al. | 356/621 |
| 5,187,874 A | * | 2/1993 | Takahashi et al. | 33/502 |
| 5,426,861 A | * | 6/1995 | Shelton | 33/502 |
| 5,572,798 A | * | 11/1996 | Barnaby | 33/549 |
| 6,072,569 A | * | 6/2000 | Bowen | 356/124 |
| 6,082,010 A | * | 7/2000 | Lee | 33/1 M |
| 6,112,423 A | * | 9/2000 | Sheehan | 33/502 |
| 2005/0235506 A1 | * | 10/2005 | Brost et al. | 33/502 |

FOREIGN PATENT DOCUMENTS

| | | |
|---|---|---|
| DE | 196 54 051 A1 | 6/1998 |
| DE | 100 06 876 C1 | 6/2001 |
| DE | 101 51 635 A1 | 5/2003 |
| JP | 6-249641 | 9/1994 |
| JP | 7-181031 | 7/1995 |
| JP | 11-6728 | 1/1999 |
| JP | 2001-507431 | 6/2001 |

* cited by examiner

*Primary Examiner*—R. Alexander Smith
(74) *Attorney, Agent, or Firm*—Rankin, Hill, Porter & Clark LLP

(57) ABSTRACT

A mount table having a mount surface on which a workpiece as an object to be measured or worked includes a support unit for supporting the mount table so as to be floated from a surface plate so that the mount table can freely move or rotate on the surface plate finished to be plane or fixing and supporting the mount table on the surface plate and a plurality of artifact for measuring a plurality of attitudes on the mount table to detect the positions and rotations of the mount table in respective attitudes.

16 Claims, 11 Drawing Sheets

MOUNT TABLE, SURFACE TEXTURE MEASURING MACHINE AND SURFACE TEXTURE MEASURING METHOD

The present application claims foreign priority based on Japanese Patent Application No. 2004-113933, filed Apr. 8, 2004, the contents of which is incorporated herein by reference.

BACKGROUND OF THE INVENTION

1. Technical Field

The present invention relates to a mount table on which a workpiece as an object to be worked or measured is mounted, a surface texture measuring machine and a surface texture measuring method. Particularly, the present invention relates to a mount table, a surface texture measuring machine and a surface texture measuring method in which a workpiece can be measured at a plurality of attitudes and the measured results can be integrated.

2. Related Art

In an ordinary measuring machine, a measurable range and a measuring direction are limited. Accordingly, under this condition, a large workpiece exceeding the measurable range or a workpiece that needs to be measured from a plurality of directions cannot be measured. Thus, when such a workpiece is measured, a method has been employed in which a measuring machine is moved along the periphery of an installed workpiece to measure respective parts of the workpiece, collect individual data and integrate the individual data (for instance, see JP-A-11-6728 (hereinafter referred as Patent Document 1)).

In a form measuring device described in the Patent Document 1, a measuring jig having a group of reference points that are previously accurately measured is provided in the vicinity of a large object to be measured, and when the object to be measured is measured by moving a measuring machine, the group of reference points are also measured. Then, the positional relation of the moved measuring machine is obtained from the measured results of the group of reference points to synthesize the coordinate data of the object to be measured and grasp an entire form.

Further, the invention has been proposed in which when a measuring machine or an object to be measured is moved, a measuring auxiliary base having an air pad is used to easily move the measuring machine or the object to be measured (for instance, see JP-A-7-181031 (hereinafter referred as Patent Document 2)).

However, in a large workpiece or a workpiece that needs to be measured and worked from a plurality of directions so that a measuring machine or a working machine is moved along the workpiece to measure and machine the workpiece, a space for installing the measuring machine and the working machine is required as well as an installing space of the workpiece. Especially, in the case of the large workpiece, a space efficiency is undesirably extremely degraded.

Particularly, when the workpiece is precisely measured and worked, both the workpiece and the measuring machine or the working machine need to be mounted on a surface plate, and the measuring machine or the working machine needs to be moved along the periphery of the workpiece to measure or machine the workpiece. Accordingly, the large surface plate is required. Especially, in the case of the large workpiece, an extremely large surface plate is required. However, such a large surface plate is expensive and needs an enormous labor and cost for maintenance. Further, a strong foundation workpiece is required over all the installing area of the surface plate, so that more cost is required. Still further, a wide installing area is inconveniently hardly ensured.

Further, in this case, a reference jig having reference points in its periphery needs to be arranged each time to meet the workpiece. Thus, much time is undesirably needed for a program for a measurement and a program for a workpiece.

SUMMARY OF THE INVENTION

It is an object of the present invention to provide a mount table, a surface texture measuring machine using the mount table and a surface texture measuring method, which can measure attitudes and directions of the workpiece by a surface plate smaller than a related-art large surface plate so that a workpiece can be measured in different attitudes and directions and the measured results can be integrated or can be processed in the different attitudes and directions.

However, the present invention need not achieve the above objects, and other objects not described herein may also be achieved. Further, the invention may achieve no disclosed objects without affecting the scope of the invention.

In order to achieve the above-described object, a mount table according to the present invention is characterized in that the mount table includes a support unit capable of floating or fixing the mount table relative to a surface plate and a plurality of artifacts (references).

Here, to provide the plurality of artifacts in the mount table includes a structure that the plurality of artifacts are provided in a reference jig and the reference jig is fixed to the mount table or a plurality of single artifacts are provided on a workpiece as well as a structure that the artifacts are directly provided on the mount table.

According to this structure, while the workpiece is mounted on a mount surface of the mount table, the mount table can be floated from the surface plate by the support unit. Thus, the mount table can be easily and lightly moved.

Further, since the mount table can be rotated on the surface plate, when a measurement is carried out by using a measuring machine, a measured surface of the workpiece is easily opposed to a detector for a measurement. In such a way, the mount table (that is, the workpiece) is rotated so that its measured surface can be directed to the detector. Accordingly, the dimension of the surface plate can be decreased more than a related-art device in which the measuring machine is moved along the periphery of the workpiece. As a result, a wide space for a measurement does not need to be ensured and the surface plate smaller than the related-art surface plate may be used, so that a cost efficiency is improved.

Further, since the plurality of artifacts are provided in the mount table, the reference jig having the reference points in its periphery does not need to be arranged each time so as to meet the large workpiece and a measurement planning efficiency is improved.

Further, since the plurality of artifacts are provided, when the measurement is carried out by using the measuring machine, the artifacts are arranged in a measurable range of the measuring machine to measure the artifacts for each attitude. Thus, even when the mount table is moved or rotated, a relative positional relation after the mount table is moved or rotated can be calculated on the basis of the artifact measured data. Accordingly, the measured data in respective attitudes can be integrated with good accuracy and the entire image of the workpiece can be precisely grasped.

The present invention is characterized in that the artifacts include at least reference balls or reference plates.

As described above, when the artifacts include reference balls, three parts or more of the surface of the reference ball are measured so that the central position of the reference ball can be calculated. Thus, the attitude of the mount table can be accurately obtained.

Further, when the artifacts include the reference plates, a plurality of points on the reference plate is measured so that the inclination or the position of the reference plate can be calculated. Thus, the attitude of the mount table can be easily obtained.

The present invention is characterized in that a static pressure fluid bearing is used as the support unit.

As described above, when the static pressure fluid bearing is used, for instance, air is jetted to the surface plate from a pad forming a bearing surface so that the mount table can be floated. On the other hand, an air flowing direction is reversed to suck air into the pad from the surface plate side and allow the pad to function as a suction pad. Accordingly, the mount table can be firmly fixed to the surface plate to make a structure simple.

Here, as a material of the pad, a well-known material may be employed. For instance, a pad made of rubber or porous metal may be employed.

To achieve the above-described object, a surface texture measuring machine according to the present invention comprises: a base; a detector for measuring a workpiece; a detector support mechanism for supporting the detector so as to be movable; and a measuring device for measuring the position or the angle of the detector. The surface texture measuring machine is characterized in that the mount table is mounted on the base.

According to the present invention, since the surface plate on which the mount table is mounted, that is, the base can be miniaturized, the large workpiece can be measured without enlarging the measuring machine. Thus, an expense and space efficiency is outstandingly improved.

In order to achieve the above-described object, a surface texture measuring method according to the present invention comprises: a positioning step of moving or rotating the mount table on which the workpiece is mounted on the base to attitude the mount table at a prescribed attitude by using the surface texture measuring machine; a fixing step of fixing the mount table on the base at the prescribed attitude; an artifact measuring step of measuring the plurality of artifacts that can be measured at the prescribed attitude to collect artifact measured data; a workpiece measuring step of collecting the workpiece measured data of the workpiece at the prescribed attitude as required; a repeating step of repeating the positioning step, the fixing step, the artifact measuring step and the workpiece measuring step as required; an attitude calculating step of calculating respectively the attitudes of the mount table relative to the base on the basis of the artifact measured data; and a workpiece measured data integrating step of connecting the workpiece measured data collected respectively in the attitudes on the basis of the calculated results of the attitudes of the mount table to form an integrated measured result.

According to this invention, since the measured data that is measured in the different attitudes of the mount table can be accurately connected or synthesized to be integrated, the entire form can be precisely gasped.

According to the present invention, since the mount table on which the workpiece is mounted can be lightly moved and rotated, for instance, when the measurement is carried out by using the measuring machine, even if a measuring position exceeds the measuring range of the measuring machine, the detector of the measuring machine can be relatively positioned to the measuring position of the workpiece.

Further, the mount table is rotated so that the workpiece can be measured by using a smaller surface plate or base.

Since the attitudes of the mount table (that is, the attitudes of the workpiece) when the mount table is moved and rotated can be respectively calculated from a plurality of artifact measured data, the workpiece measured data respectively in the attitudes can be accurately connected or synthesized to be integrated. As a result, the entire form can be easily and precisely grasped.

DETAILED DESCRIPTION OF THE INVENTION

Figure 1:
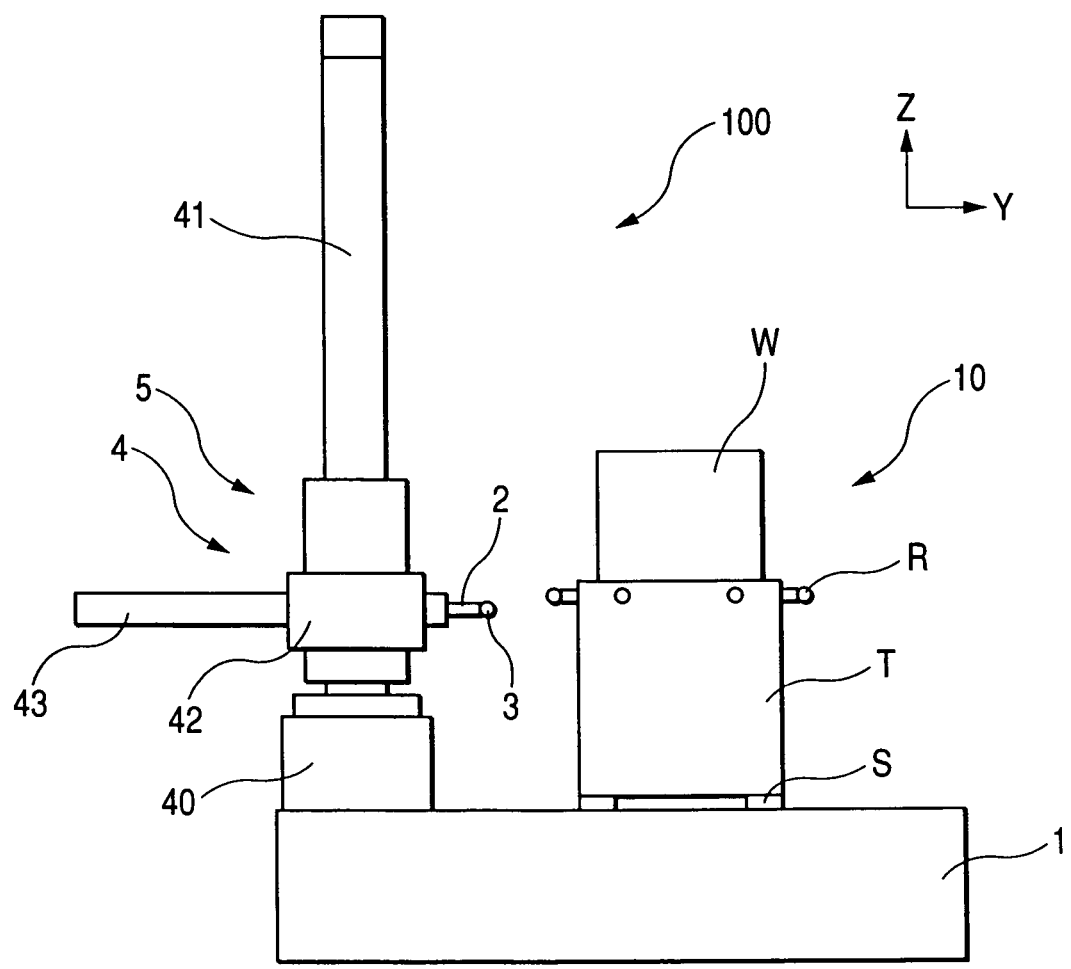
FIG. 1 is a side view of a surface texture measuring machine according to a first exemplary, non-limiting embodiment of the present invention.

Now, preferred embodiments of the present invention will be described below by referring to the drawings.

[First Embodiment]

Figure 2:
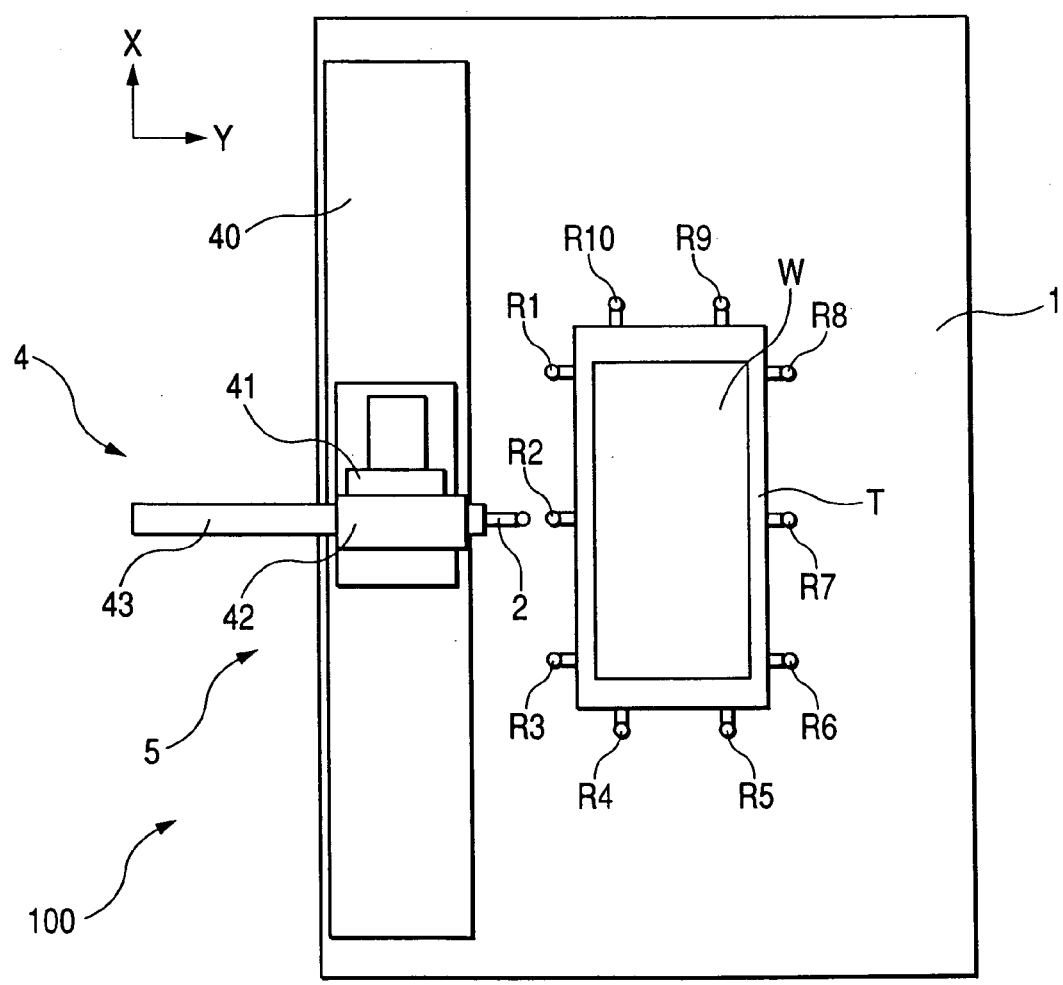
FIG. 2 is a plan view of the surface texture measuring machine according to the first exemplary, non-limiting embodiment of the present invention.

FIG. 1 is a side view of a surface texture measuring machine 100 in which a mount table 10 according to a first exemplary, non-limiting embodiment of the present invention is mounted on a base 1 as a surface plate. FIG. 2 is a plan view thereof.

Figure 3:
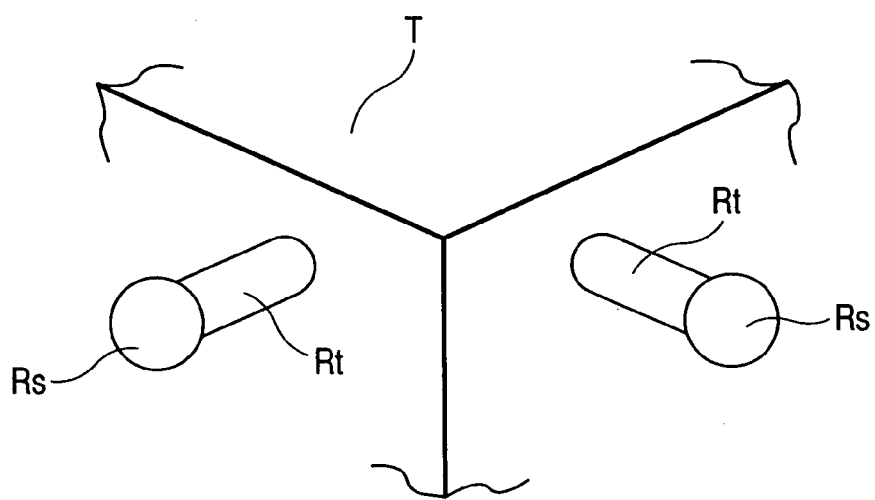
FIG. 3 is a perspective view of an artifact of a mount table according to the first exemplary, non-limiting embodiment of the present invention.

An upper surface of a table main body T of the mount table 10 serves as a workpiece mount surface and a workpiece W is mounted thereon. On the upper parts of the side surfaces of the table main body T, a plurality of artifacts R are disposed at prescribed intervals on the periphery of the mount table T so that supports Rt having reference balls Rs at their ends protrude sideward (rightward and leftward of a sheet surface and vertical directions of the sheet surface in FIG. 1) (see FIG. 3). The relative positional relation of the central positions of the plurality of the reference balls Rs is previously precisely measured.

On the lower surface of the table main body T, air bearings as support units S are disposed at four corners of the table main body T. The mount table 10 can be floated from the base 1 by the air bearings or the mount table 10 can be fixed to the base 1.

Figure 4:
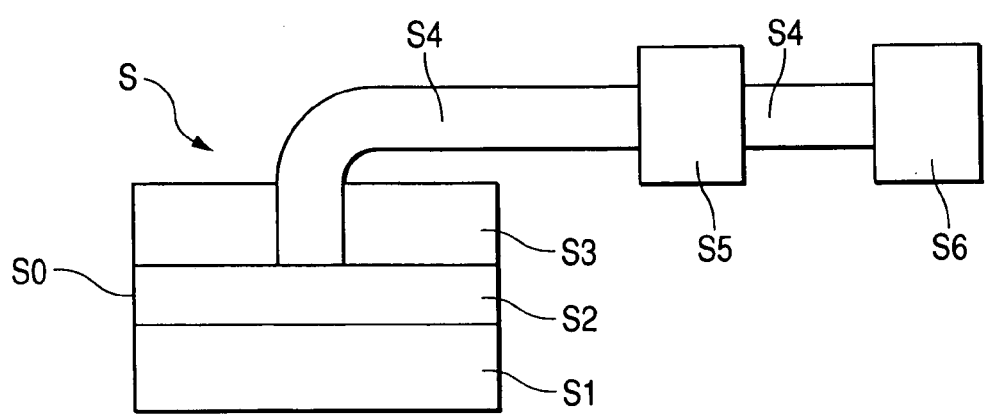
FIG. 4 is a sectional view of a support unit according to the first exemplary, non-limiting embodiment of the present invention.

FIG. 4 shows the support unit S and an air bearing part shows its sectional structure. The air bearing part has a substantially circular form in its horizontal section. In an inner part of an outer tube S0, a pad S1, a gap part S2 and a piping connecting part S3 are incorporated. The piping connecting part S3 is connected to a pressure source S6 through piping S4. A transfer valve S5 is provided halfway the piping.

The pad S1 is made of a porous material (porous metal) and has innumerable micro-holes passing through a front part and a back part (an upper part and a lower part in FIG. 4).

When the pressure source S6 is activated by a switch that is not shown in the drawing, compressed air is supplied to the transfer valve S5 and the gap part S2 through the piping S4. The compressed air is jetted to the base 1 from the micro-holes of the pad S1 to give a floating force to the pad S1 so that the mount table 10 is floated from the base 1. Under the floating state, since a frictional force and the gravity of the workpiece do not exist, the mount table 10 (that is, the workpiece W) can be lightly moved and rotated.

After the mount table 10 is positioned at a prescribed position (attitude), when the pressure source S6 is switched by a switch that is not shown in the drawing so as to generate negative pressure as a negative source, the air of the gap part S2 is sucked through the piping S4. Thus, the pad S1 sucks the air from the base 1 side. In accordance with this operation, the pad S1 serves as a suction pad to suck and fix the mount table 10 to the base 1.

The transfer valve S5 releases the air in the piping S4 to atmospheric air as required.

Figure 5:
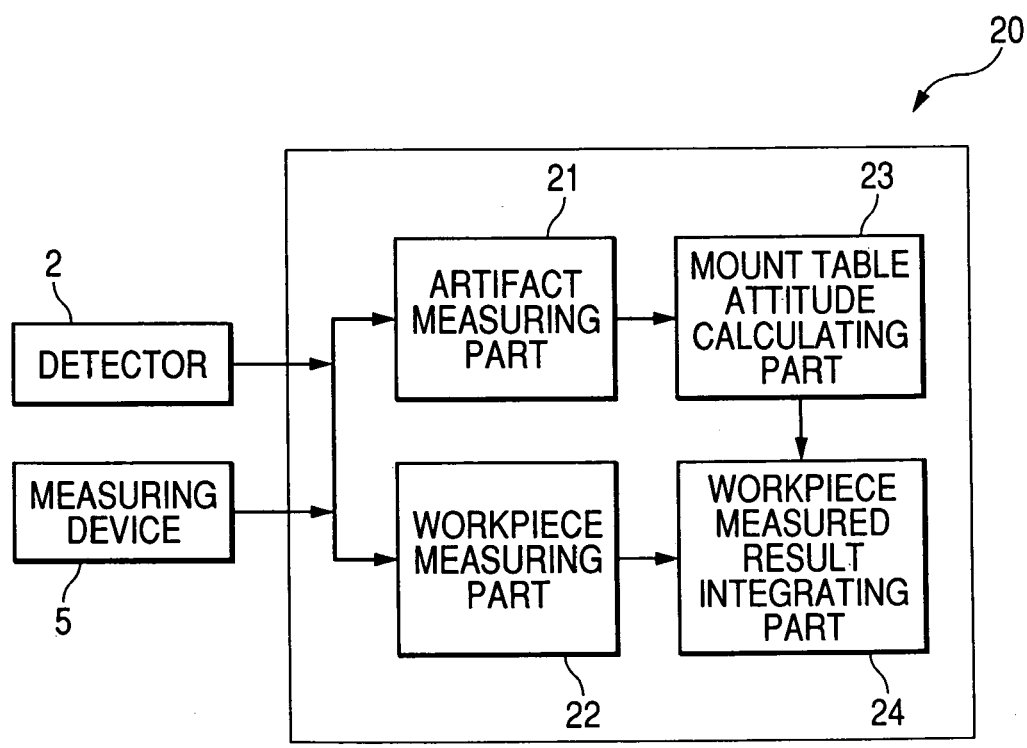
FIG. 5 is a block diagram of a data processor according to the first exemplary, non-limiting embodiment of the present invention.

The surface texture measuring machine 100 includes the base 1 whose upper surface is finished as a plane, a measuring mechanism disposed rearward of the base 1 (leftward of the sheet surface shown in FIG. 1) and a data processor 20 (see FIG. 5).

The measuring mechanism includes a detector 2 having a measuring member 3 for measuring the workpiece W at its end, a detector support mechanism 4 for supporting the detector so as to be movable in the directions of three axes (X-axis, Y-axis and Z-axis) intersecting at right angles relative to the base 1 and a measuring device (a linear scale) 5 for measuring the positions of the directions of the three axes intersecting at right angles of the detector.

The detector support mechanism 4 includes an X-axis guide mechanism 40 disposed on the base 1, an X-axis slider 41 guided in the direction of an X-axis (the vertical direction of the sheet surface shown in FIG. 1) by the guide mechanism 40 so as to be movable, a Z-axis slider 42 guided in the direction a Z-axis (upward and downward of the sheet surface shown in FIG. 1) along the X-axis slider 41 so as to be movable, and a Y-axis slider 43 guided in the direction of a Y-axis (rightward and leftward of the sheet surface shown in FIG. 1) along the Z-axis slider 42 so as to be movable. In one end of the Y-axis slider 43 (a right side of the sheet surface shown in FIG. 1), the detector 2 is disposed.

Since the positions of the X-axis slider 41, the Y-axis slider 43 and the Z-axis slider 42 are measured by the measuring device 5 (an X-axis linear scale, a Y-axis linear scale and a Z-axis linear scale), the position of the measuring member 3 of the detector 2 (a central position of a spherical measuring member 3) is readily determined from the values of the measuring device 5.

The data processor 20 shown in FIG. 5 integrates the measured results of the workpiece W in respective attitudes from the measured results of the detector 2 and the measuring device 5 to form and output an integrated measured result.

The data processor 20 includes a artifact measuring part 21 for measuring a plurality of artifacts respectively in the attitudes of the mount table 10 to store the artifact measured results, a mount table attitude calculating part 23 for calculating the attitudes of the mount table 10 respectively relative to the base 1 on the basis of the artifact measured results, a workpiece measuring part 22 for measuring the workpiece W respectively in the attitudes of the mount table 10 to store the workpiece measured results and a workpiece measured result integrating part 24 for converting the workpiece measured results in the attitudes stored in the workpiece measuring part 22 into an integrated coordinate on the basis of the attitudes of the mount table calculated by the mount table attitude calculating part 23 and connecting the workpiece measured results respectively converted to the integrated coordinate to form an integrated measured result.

Figure 6:
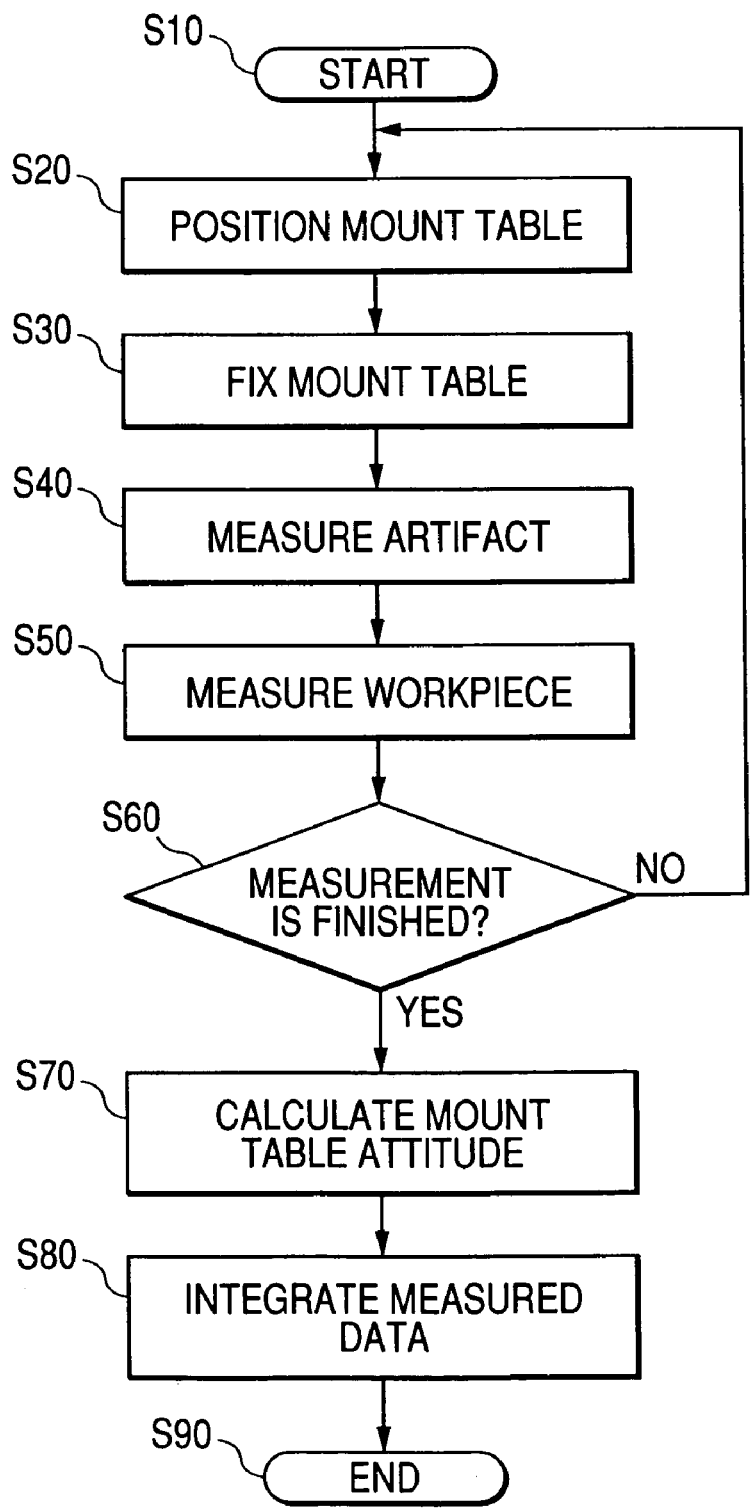
FIG. 6 is a flowchart showing a surface texture measuring method according to the present invention.

A procedure for measuring the workpiece W by the surface texture measuring machine 100 constructed as described above will be described by a flowchart shown in FIG. 6.

Instating a measuring procedure of step S10, the relative positional relation of each artifact is previously measured. Since the artifacts are securely provided on the mount table 10, the relative positional relation of the artifacts does not need to be newly measured for each measurement of the workpiece.

In step S20, the mount table 10 is floated by the support unit S to position the mount table 10 at, for instance, an attitude shown in FIG. 2.

Then, in step S30, the pad S1 of the support unit S is switched to a suction to fix the mount table 10 to the base 1 as a first attitude.

Subsequently, in step S40, the three parts on the surfaces of the reference balls of the artifacts R1, R2 and R3 under the first attitude are respectively measured and the results (artifact measured data) are stored in the artifact measuring part 21.

Then, in step S50, the workpiece W in the first attitude is measured to store the workpiece measured result (workpiece measured data) in the workpiece measuring part 22.

Then, in step S60, whether or not all measurement of the workpiece W is completed is decided. When all the measurement is not completed, the procedure returns to the step S20. When all the measurement is completed, step S70 is performed.

Figure 7:
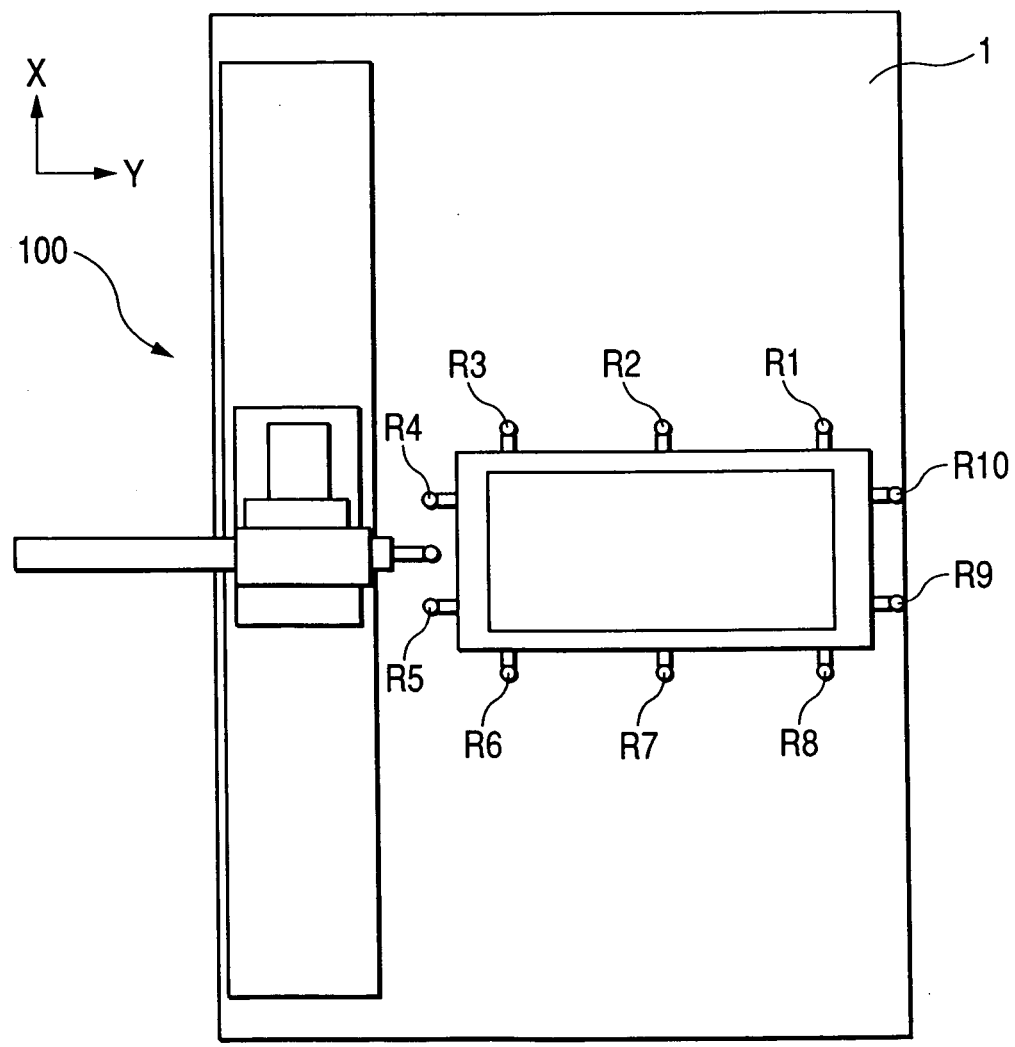
FIG. 7 is a diagram for explaining a measuring procedure according to the first exemplary, non-limiting embodiment of the present invention.

When the procedure returns from the step S60 to the step S20, in the step S20 and the step S30, the workpiece W is positioned and fixed to a second attitude. The second attitude in this case is shown in FIG. 7.

In the second attitude, in the step S40, the artifacts R4 and R5 are measured. In the step S50, the workpiece W is measured.

The mount table 10 is rotated and positioned to obtain a third attitude and a fourth attitude in the same manner as described above. The workpiece W shown in this embodiment is substantially a rectangular parallelepiped. Accordingly, all the measurements may be completed by measuring four attitudes from the first attitude to the fourth attitude. However, necessary attitudes may be selected in accordance with the form of a workpiece and measurements may be carried out in first to nth attitudes.

Then, in step S70, the attitudes (for instance, attitudes from the first attitude to the fourth attitude) of the mount table 10 are respectively calculated. Here, the relative positional relation of each artifact of the artifact R1 to the artifact R10 is previously measured oral ready known. Thus, on the basis of the artifact measured results stored in the artifact measuring part 21, the attitudes of the mount table relative to the base 1 are respectively calculated in the mount table attitude calculating part 23. That is, the position and inclination in each of the attitudes of the mount table 10 in an XYZ coordinate system are obtained from the measured results of the artifacts R1 to R10 and the already known relative positional relations of the artifacts in the XYZ coordinate system of the surface texture measuring machine 100.

Subsequently, in step S80, the integrated measured result is formed by the workpiece measured result integrating part 24. In a process in the step S80, an integrated coordinate system is firstly determined. As the integrated coordinate system, any coordinate system that can determine the relation (position, inclination) to the XYZ coordinate system of the surface texture measuring machine 100 can be converted from the XYZ coordinate system. Accordingly, any coordinate system may be employed. Here, for the purpose of simplifying an explanation, an example that the XYZ coordinate system of the surface texture measuring machine 100 is used as the integrated coordinate system will be described.

Since the attitudes (positions, inclinations) of the mount table in the XYZ coordinate system are completely calculated, the measured results of the workpiece W in the respective attitudes are respectively converted to XYZ coordinate systems having no dislocations nor inclinations on the basis of the results. After that, the individual converted workpiece measured results in the attitudes are synthesized and connected to form the integrated measure result of the workpiece measured results.

Then, in step S90, the integrated measured result is outputted (a display output, a print output, a storage in a storage device, an output to an external output device, etc.) to finish the process.

In the first exemplary, non-limiting embodiment, an explanation is given on the assumption that the relative positional relations of the artifacts are already known. However, the relative positional relations of the artifacts may not be necessarily already known.

When the relative positional relations of the artifacts are not already known, for instance, an intermediate attitude is provided in which both the artifacts measured in the first attitude and the second attitude can be measured. In the intermediate attitude, at least two artifacts measured in the first attitude and at least two artifacts measured in the second attitude may be measured.

Figure 8:
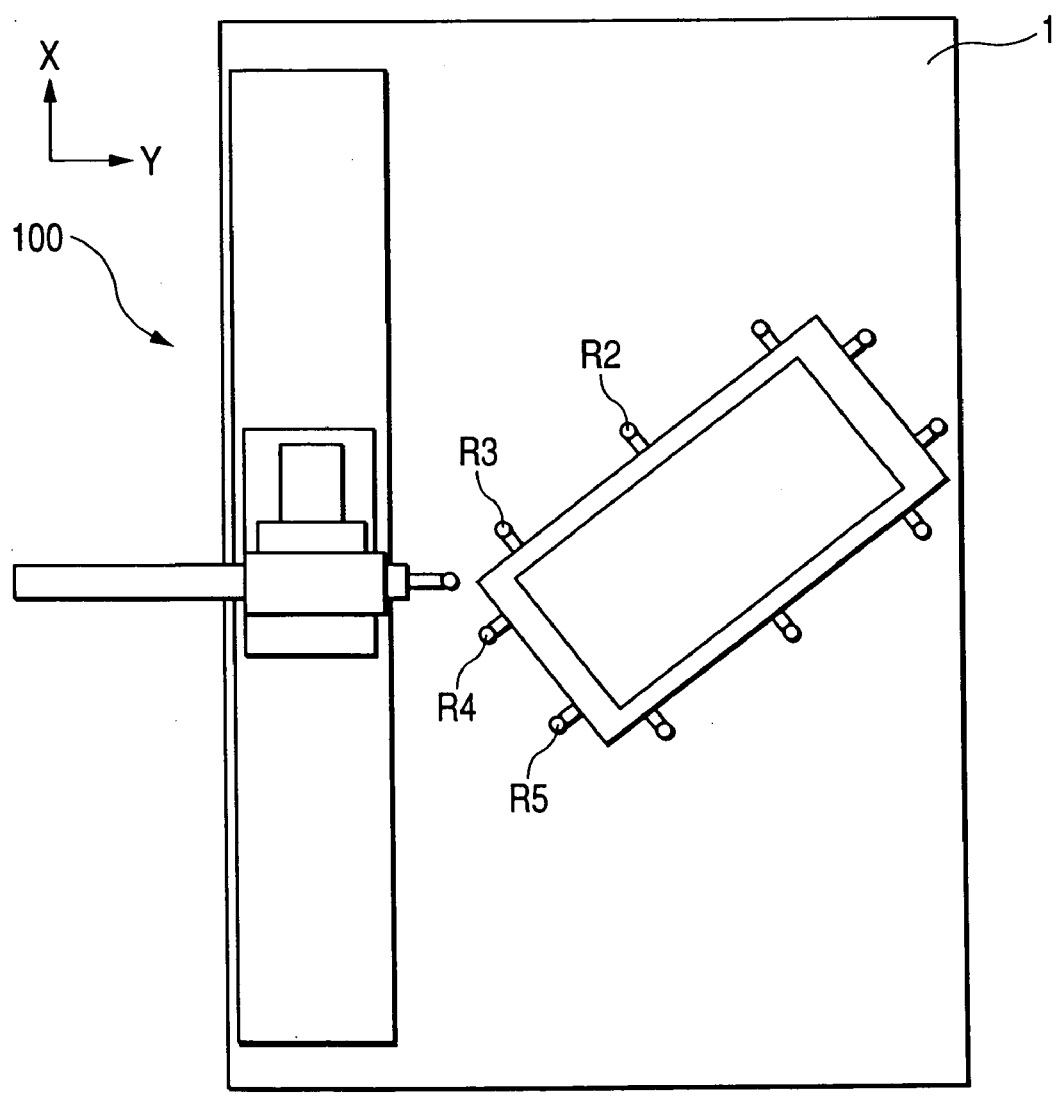
FIG. 8 is a diagram for explaining another measuring procedure according to the first exemplary, non-limiting embodiment of the present invention.

For instance, when the relative positional relations of the artifacts in the first exemplary, non-limiting embodiment are not already known, in an intermediate attitude shown in FIG. 8, the artifacts R2, R3, R4 and R5 are measured so that the position and the inclination of the second attitude relative to the first attitude can be obtained. Accordingly, the integrated measured result of the workpiece measured results can be finally formed. In the first exemplary, non-limiting embodiment, an intermediate attitude in which the artifacts R4, R5, R6 and R7 measured in the second attitude and the third attitude can be measured and an intermediate attitude in which the artifacts R7, R8, R9 and R10 measured in the third attitude and the fourth attitude can be measured may be provided.

In this case, when the artifacts R9, R10, R1 and R2 measured in the fourth attitude and the first attitude are measured in an intermediate attitude in which these artifacts can be measured, it is to be understood that an error when the measured data is synthesized and connected can be limited to a minimum value.

[Second Embodiment]

Now, by referring to FIG. 9, a surface texture measuring machine according to a second exemplary, non-limiting embodiment of the present invention will be described.

In the mount table 10 shown in the first exemplary, non-limiting embodiment, on the upper parts of the side surfaces of the table main body T, a plurality of artifacts R are disposed at prescribed intervals on the periphery of the mount table T so that supports Rt having reference balls Rs at their ends protrude sideward (rightward and leftward of a sheet surface and vertical directions of the sheet surface shown in FIG. 1). However, in the second exemplary, non-limiting embodiment, artifacts include reference plates Rp shown in FIG. 9 in place of the reference balls Rs and the supports Rt.

Since other points are the same as those of the first exemplary, non-limiting embodiment, an explanation thereof is omitted.

The reference plate Rp has a form of a rectangular parallelepiped finished to be plane. The reference plates Rp are disposed on a plurality of positions in the upper parts of the side surfaces of a table main body T like the first exemplary, non-limiting embodiment.

Figure 9:
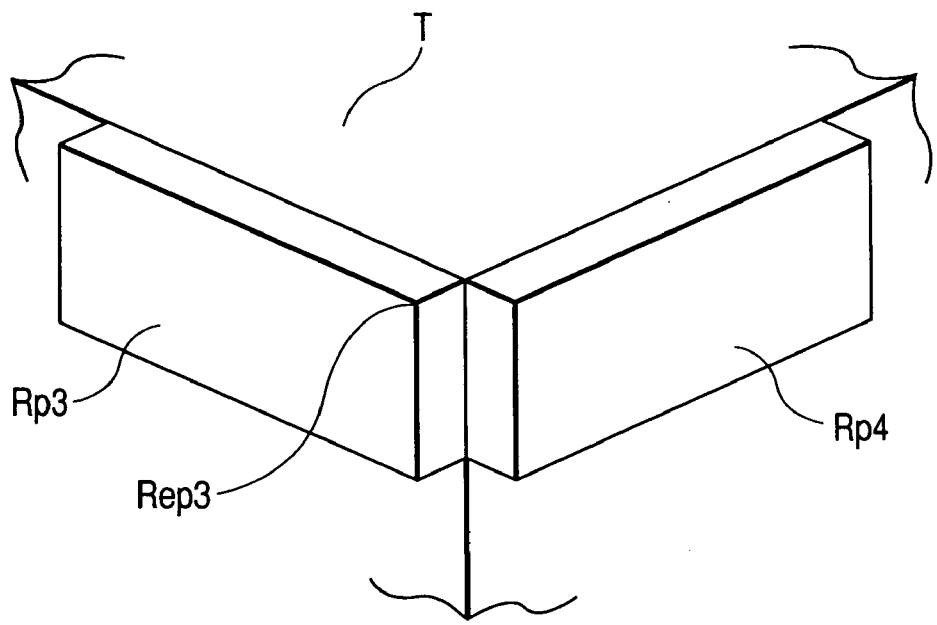
FIG. 9 is a perspective view of an artifact of a mount table according to a second exemplary, non-limiting embodiment of the present invention.

As an example, an intersection point Rep 3 of three edge lines shown in FIG. 9 may be considered as the reference position of the reference plate Rp 3. In this case, on each of three surfaces, three positions are respectively measured to determine the surfaces respectively and obtain the intersection point of them. Thus, the reference position Rep 3 can be obtained.

In such a way, even when the reference plates Rp are used, the integrated measured result of workpiece measured results can be formed similarly to the case in which the reference balls Rs are used.

Figure 10:
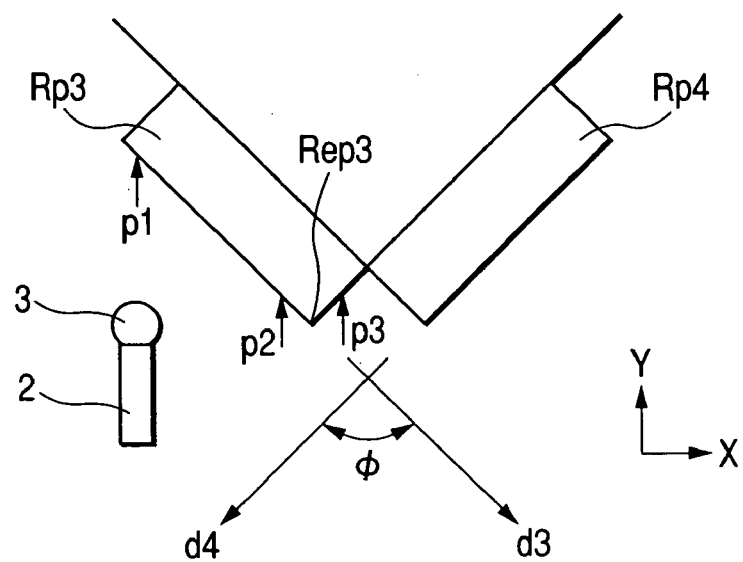
FIG. 10 is an explanatory view of a measuring method for the artifact according to the second exemplary, non-limiting embodiment of the present invention.

Here, as a modified example, a simple measuring method of an artifact is described with reference to FIG. 10.

A mount table 10 is fixed to a base 1 as a surface plate to measure a workpiece W. Ordinarily, since the base 1 is finished to be plane and parallel to the XY plane of the XYZ coordinate system of a surface texture measuring machine 100. Accordingly, in the measurement of each artifact, the coordinate values of a Z-axis may be frequently obtained by a simple measurement without any difficulty. In such a case, as artifact coordinate values in the direction of the Z-axis, coordinates of the Z-axis on the mount surface of the mount table 10 may be measured in place of the measurement of each of artifacts.

In this case, in the measurement of each of the artifact in each of attitudes, the position and inclination of the mount table 10 in the XY plane may be measured. In the example shown in FIG. 10, for instance, a point p1 and a point p2 in the first surface of the reference plate Rp3 are measured. Further, a point p3 in the second surface of the reference plate Rp3 and the upper surface of the mount table are measured so that the reference position Rep 3 of the reference plate Rp3 can be determined. The reference position of a reference plate Rp4 shown in FIG. 10 may be obtained in the same manner as described above.

Consequently, the direction d3 of the installing surface of the reference plate Rp3 and the direction d4 of the installing surface of the reference plate Rp4 can be respectively obtained and the intersection angle Φ of them can be also obtained.

In such a way, since the position and the inclination of each of the artifacts can be obtained, the integrated measured result of the workpiece measured results can be like wise for medal so in the modified example in which the simple measurement is carried out.

Here, the example that when the direction d1 is calculated, the measured results of the point p1 and the point p2 on the side surface of the reference plate Rp3 are used is shown. However, it is to be understood that the direction may be obtained from the measured results of points of side surfaces of a reference plate Rp1 or and Rp2 in place thereof.

[Third Embodiment]

Now, a surface texture measuring machine according to a third exemplary, non-limiting embodiment will be described by referring to FIG. 11.

The mount table 10 shown in the first exemplary, non-limiting embodiment only has the mount surface on which the workpiece W is mounted on its upper part. However, in the third exemplary, non-limiting embodiment, a mount table 30 has a sucking unit for sucking a workpiece W on the mount surface of the mount table 30.

Other points are the same as those of the first exemplary, non-limiting embodiment, an explanation thereof is omitted.

Figure 11:
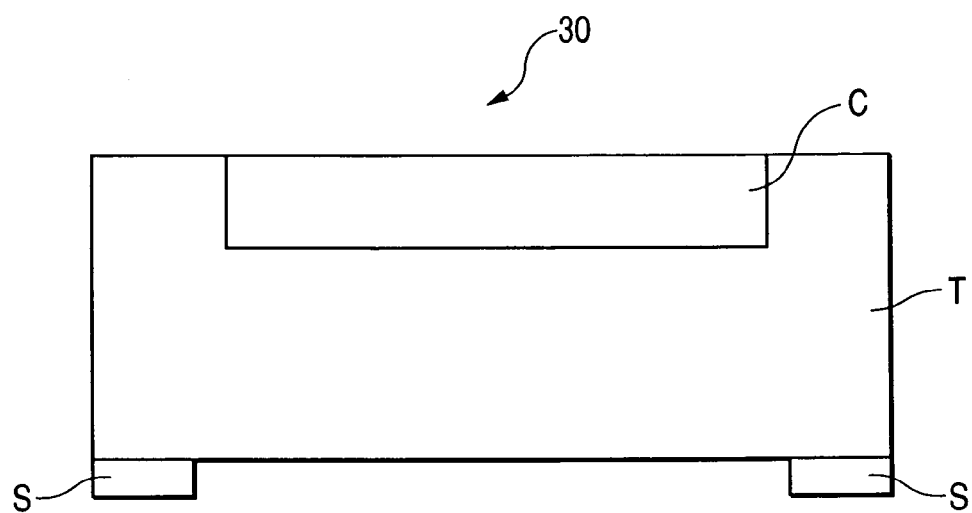
FIG. 11 is a sectional view of a mount table according to a third exemplary, non-limiting embodiment of the present invention.

FIG. 11 shows a section of the mount table 30. A sucking unit C is provided on the upper part of a table main body T of the mount table 30.

Figure 12:
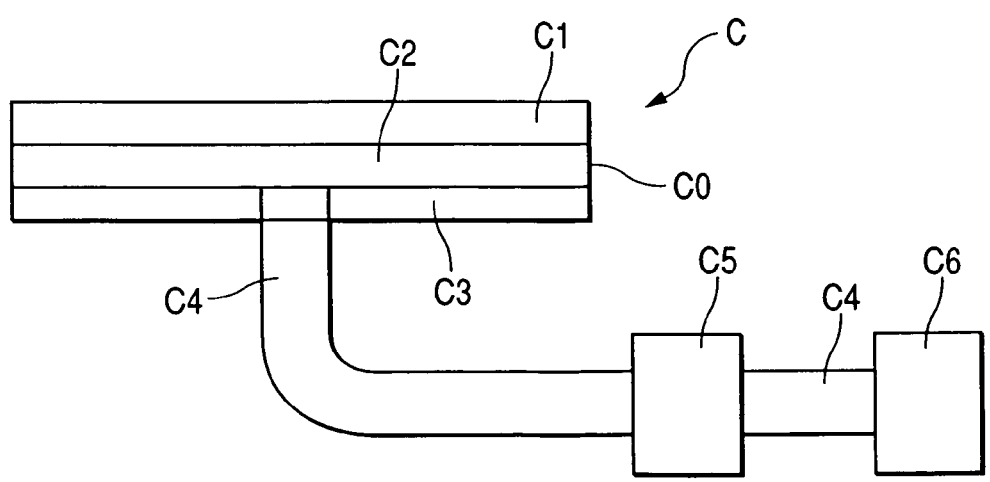
FIG. 12 is a sectional view of a sucking unit of the mount table according to the third exemplary, non-limiting embodiment of the present invention.

FIG. 12 shows a section of the sucking unit C. The sucking unit C has a substantially rectangular form in its horizontal section. In an outer tube C0, a suction pad C1, a gap part C2 and a piping connecting part C3 are incorporated. The piping connecting part C3 is connected to a negative pressure source C6 through piping C4. A transfer valve C5 is provided halfway the piping.

The pad C1 is made of a porous material (porous metal) and has innumerable micro-holes passing through a front part and a back part (an upper part and a lower part of FIG. 12)

When the negative pressure source C6 is activated by a switch that is not shown in the drawing, air in the gap part C2 is sucked through the piping C4, so that the pad C1 sucks air from atmospheric air. The pad C1 serves as a suction pad in accordance with this operation to suck and fix a workpiece W on the mount surface of the mount table 30.

The transfer valve C5 allows the inner part of the piping C4 to communicate with the atmospheric air as required.

[Fourth Embodiment]

Figure 13:
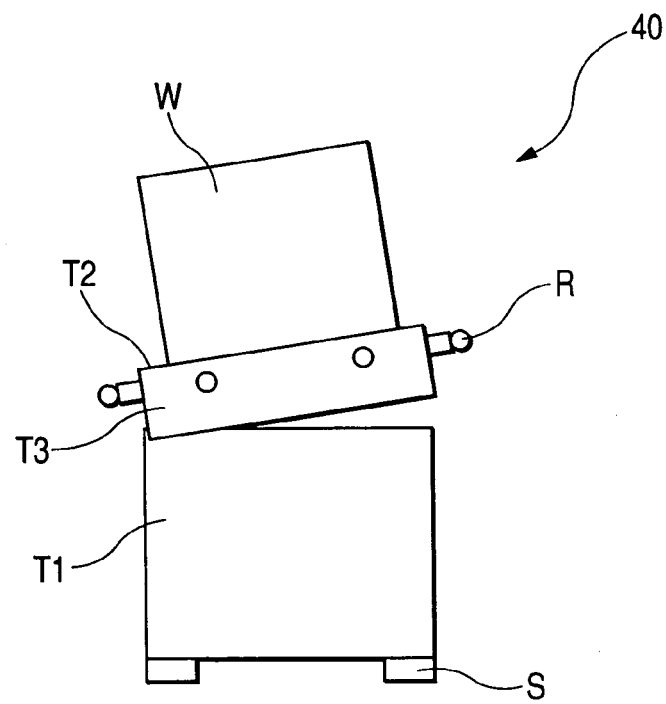
FIG. 13 is a side view of a mount table according to a fourth exemplary, non-limiting embodiment of the present invention.

Now, referring to FIG. 13, a surface texture measuring machine according to a fourth exemplary, non-limiting embodiment will be described below.

The mount table 10 shown in the first exemplary, non-limiting embodiment only has the mount surface on which the workpiece W is mounted on its upper part. However, in the fourth exemplary, non-limiting embodiment, a mount table 40 includes a table main body T1, a mount surface T2, an installing part T3 on which a plurality of artifacts R are installed and a tilting mechanism that is not shown in the drawing. The installing part T3 can be tilted integrally with the mount surface T2 relative to the table main body T1 by the tilting mechanism. FIG. 13 shows an example that the installing part is tilted rightward and leftward. However, the installing part T3 may be formed so as to be tilted forward and backward. The tilting mechanism can roughly move or finely move so that the tilting mechanism can position a workpiece W to an optimum tilted position.

As a tilting unit, since various kinds of well-known mechanisms can be employed, a detailed description is omitted. Other points are the same as those of the first exemplary, non-limiting embodiment, an explanation thereof is omitted.

Figure 14:
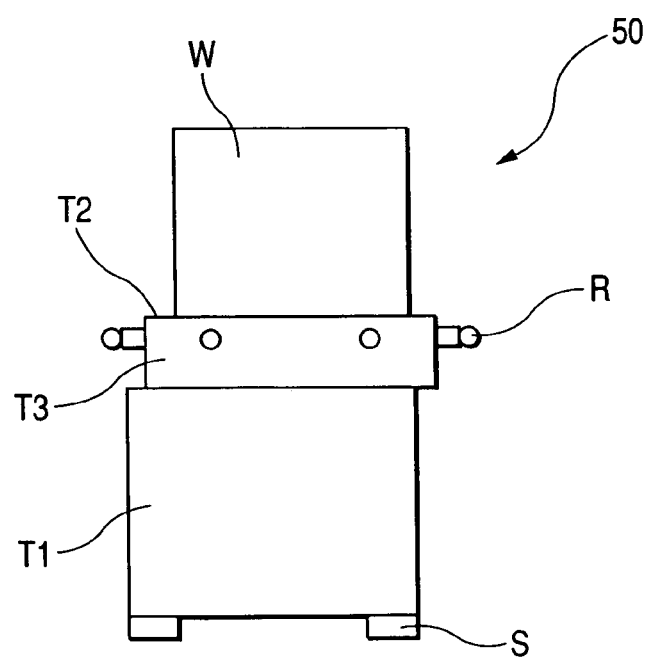
FIG. 14 is a side view showing a modified example of the mount table according to the fourth exemplary, non-limiting embodiment of the present invention.

FIG. 14 shows a mount table 50 as a modified example. This mount table 50 includes a table main body T1, a mount surface T2, an installing part T3 on which a plurality of artifacts R are installed and a moving mechanism that is not shown in the drawing. The installing part T3 can be moved integrally with the mount surface T2 relative to the table main body T1 by the moving mechanism. FIG. 14 shows an example that the installing part is moved rightward and leftward. However, the installing part T3 may be formed so as to be moved forward and backward. The moving mechanism can roughly move or finely move so that the moving mechanism can position a workpiece W to an optimum position.

As a moving unit, since various kinds of well-known mechanisms can be employed, a detailed description is omitted. Other points are the same as those of the first exemplary, non-limiting embodiment, an explanation thereof is omitted.

Figure 15:
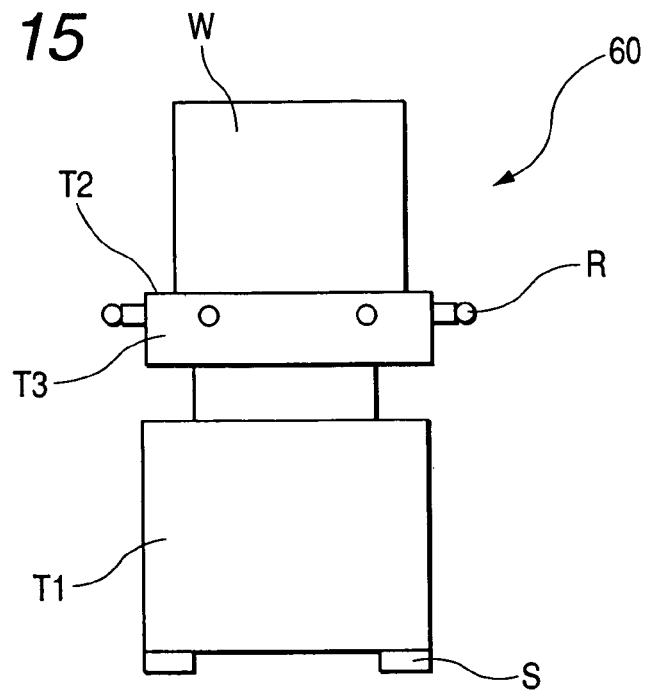
FIG. 15 is a side view showing another modified example of the mount table according to the fourth exemplary, non-limiting embodiment of the present invention.

FIG. 15 shows a mount table 60 as a modified example. This mount table 60 includes a table main body T1, a mount surface T2, an installing part T3 on which a plurality of artifacts R are installed and a lifting and lowering mechanism that is not shown in the drawing. The installing part T3 can be lifted and lowered integrally with the mount surface T2 relative to the table main body T1 by the lifting and lowering mechanism. The lifting and lowering mechanism can roughly move or finely move so that the lifting and lowering mechanism can position a workpiece W to an optimum tilted position.

As a lifting and lowering unit, since various kinds of well-known mechanisms can be employed, a detailed description is omitted. Other points are the same as those of the first exemplary, non-limiting embodiment, an explanation thereof is omitted.

Figure 16:
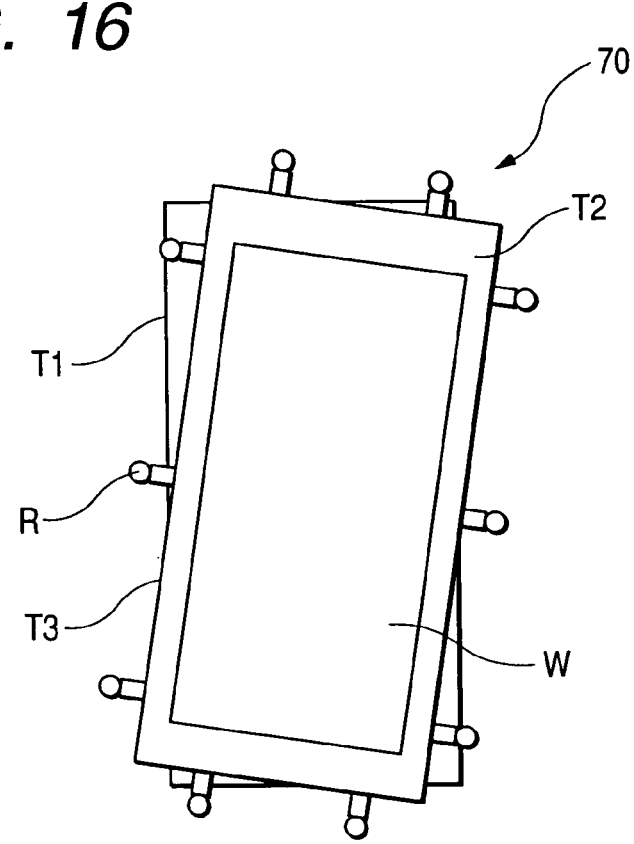
FIG. 16 is a side view showing a still another modified example of the mount table according to the fourth exemplary, non-limiting embodiment of the present invention.

FIG. 16 shows a mount table 70 as a modified example. This mount table 70 includes a table main body T1, a mount surface T2, an installing part T3 on which a plurality of artifacts R are installed and a rotating mechanism that is not shown in the drawing. The installing part T3 can be rotated integrally with the mount surface T2 relative to the table main body T1 by the rotating mechanism. The rotating mechanism can roughly move or finely move so that the rotating mechanism can rotate and position a workpiece W to an optimum tilted position.

As a rotating unit, since various kinds of well-known mechanisms can be employed, a detailed description is omitted. Other points are the same as those of the first exemplary, non-limiting embodiment, an explanation thereof is omitted.

The present invention is not limited to these embodiments.

For instance, in the above-described embodiments respectively, examples that the large workpiece is measured are described. However, according to the present invention, even when a small workpiece is employed, a measuring machine smaller than the related-art measuring machine can be extremely economically realized.

Further, in the first exemplary, non-limiting embodiment, as the surface texture measuring machine, an example is described in which a horizontal three-dimensional measuring machine having a rectangular coordinate system is used. However, the present invention is not limited thereto and any measuring machine may be employed. For instance, a surface roughness gauge or a profile measuring machine may be employed. Further, an articulated arm type measuring machine having a polar coordinate system may be used. Further, a measuring machine using a cylindrical coordinate system or various kinds of coordinate systems combined together may be used. Further, a measuring machine having the detector 2 or the measuring member 3 mounted through an extended arm may be used. Still further, the detector 2 or the measuring member 3 may be replaced by another member.

Further, as the detector 2, a detector that performs a non-contact type measurement by using a laser, an electrostatic capacity, an image, etc. may be used as well as a detector that carries out a contact type measurement. A copy measuring probe may be used as well as a point measuring probe.

In the first exemplary, non-limiting embodiment, as the support unit S of the mount table, the structure that four support units are provided in the four corners of the lower surface of the mount table is described. However, when one or more support units are provided depending on load weight, the number of the support units is not limited to a specific value.

In the first exemplary, non-limiting embodiment, the structure that the mount surface of the mount table is plane is shown. However, various kinds of mount surfaces may be employed depending on the form of the workpiece W. Briefly, the workpiece W may be mounted on the mount table in a stable condition.

Further, various kinds of workpiece fixing jigs may be used on the mount table.

In the first exemplary, non-limiting embodiment (FIG. 3) and the second exemplary, non-limiting embodiment (FIG. 9), as the artifact provided on the mount table, the artifact having the reference balls Rs or the reference plates Rp is shown. However, the present invention is not limited thereto and any artifact that can determine a position may be employed. For instance, in the first exemplary, non-limiting embodiment, the supports Rt may not be provided and the reference balls Rs may be directly fixed to or embedded in the table main body.

Further, the artifact may be a groove part or a protruding part. Further, the artifact may be a cross groove part or a cross protruding part.

Further, the artifact may be a colored marker or the like.

In the first exemplary, non-limiting embodiment (FIG. 3) and the second exemplary, non-limiting embodiment (FIG. 9), the structures that the artifacts are provided on the side surfaces of the mount tables are shown. However, the present invention is not limited thereto and the artifacts may be provided on the upper surface of the mount table.

Further, a collar part may be provided on the upper surface of a mount table and a artifact may be provided on the lower surface of the collar part.

For the purpose of a dust prevention, a rust prevention and a prevention of a breakage due to collision, a part or all of a plurality of artifacts may be provided with covers.

Further, a cleaning unit may be provided for maintaining the artifacts cleanly.

In the first exemplary, non-limiting embodiment, the structure that a plurality of artifacts are provided on the mount table is described. However, the present invention is not limited thereto and a plurality of artifacts may be provided in a jig and the jig may be fixed to a mount table.

Further, a jig provided with a plurality of artifacts may be fixed to a workpiece W.

Still further, a plurality of single artifacts may be fixed to a workpiece.

In the first exemplary, non-limiting embodiment, the structure is shown in which as the support unit of the mount table, the air bearing is shown and when the mount table is fixed to the base, the pad of the air bearing is seated on the surface plate (base). However, the present invention is not limited thereto and a fixing leg that is different from the pad and expansible upward and downward may be provided. When a mount table is fixed to a surface plate, the fixing leg may protrude to fix the mount table to the surface plate.

In the third exemplary, non-limiting embodiment (FIG. 11), the structure that one sucking unit is provided is shown. However, the present invention is not limited thereto and a plurality of sucking units may be provided as required. Further, the suction pad may be divided into a plurality of parts and a common negative pressure source may be used.

In the fourth exemplary, non-limiting embodiment and the modified examples thereof (FIGS. 13 to 16), the structures that the installing part T3 is tilted, moved, rotated, and lifted and lowered relative to the table main body T1 are shown. However, the present invention is not limited thereto and the mount table 10 in the first exemplary, non-limiting embodiment may be tilted, moved, rotated and lifted and lowered relative to the base 1.

For instance, the support unit S of a mount table may include such a mechanism for tilting, moving, rotating and lifting and lowering the mount table.

In the above-described embodiments respectively, the workpiece having a rectangular parallelepiped form is shown. However, any form of a workpiece may be used.

As the mount table shown in the embodiments, the mount table is used to mount the workpiece thereon to perform a measurement. However, the mount table may be used to workpiece or machine the workpiece mounted on the mount table.

In that case, since the artifacts of the mount table can be measured by a measuring machine provided in a working machine to measure positions and inclinations in the respective attitudes of the mount table. Accordingly, a coordinate transformation can be applied to the working program of the working machine to perform a working process.

It will be apparent to those skilled in the art that various modifications and variations can be made to the described preferred embodiments of the present invention without departing from the spirit or scope of the invention.

As described above, in the mount table according to the present invention, the mount table on which the workpiece is mounted can be moved and rotated lightly. Accordingly, for instance, when the measurement is carried out by the measuring machine, even if the part to be measured exceeds the measuring range of the measuring machine, the detector of the measuring machine can be relatively positioned to the part of the workpiece to be measured. Thus, a degree of freedom for a measurement is improved and a degree of freedom for working can be also improved.

Further, the mount table is rotated so that the workpiece can be measured by using a smaller surface plate or base. Accordingly, the present invention is extremely economical.

Further, the attitudes of the mount table (that is, the attitudes of the workpiece) when the mount table is moved and rotated can be calculated from a plurality of measured data. Accordingly, the workpiece measured data in the respective attitudes can be accurately connected or synthesized to be integrated. As a result, since the entire form can be easily ad precisely grasped, a complicated workpiece having a complicated form that needs to be measured from many directions can be efficiently measured.

Further, in the surface texture measuring machine using the mount table, a space saving measuring machine can be extremely economically realized. Further, in the surface texture measuring method, a complicated workpiece form can be measured from optimum directions and the measured results can be accurately integrated so that the efficiency of a measurement is improved.

As described above, the present invention can be greatly effectively practiced in the fields of measurement and workpiece.

I claim:

1. A mount table comprising:
   a table main body having a mount surface on which a workpiece to be measured or worked is mounted,
   a support unit disposed beneath the table main body that supports the table main body so as to permit the table main body to float above a surface plate and freely move in X and Y planes and rotate about a Z axis on the surface plate during positioning of the workpiece into a prescribed attitude and wherein, when the workpiece is at the prescribed attitude, the support unit causes the table main body to suck onto the surface plate and thereby prevent movement in the X and Y planes and prevent rotation about the Z axis so as to permit measurement or working of the workpiece at the prescribed attitude, and
   a plurality of artifacts for measuring a plurality of attitudes of the mount table, wherein the plurality of the artifacts are directly provided on the table main body and extend outwardly therefrom.

2. The mount table according to claim 1, wherein the plurality of the artifacts include at least one of reference balls and reference plates.

3. The mount table according to claim 1, wherein at least one of a relative position and a relative angle is already known for each of the plurality of the artifacts.

4. The mount table according to claim 1, wherein the plurality of the artifacts extend from the mount table and are provided at prescribed intervals about a periphery of the mount table main body.

5. The mount table according to claim 1, wherein the support unit is a static pressure fluid bearing having a pad to jet or suck at least fluid relative to the surface plate from the pad.

6. The mount table according to claim 5, wherein the pad includes a porous material.

7. The mount table according to claim 1, wherein a sucking unit including a suction pad for sucking the workpiece is further provided on the mount surface.

8. The mount table according to claim 7, wherein the suction pad includes a porous material.

9. The mount table according to claim 1, wherein the mount table further comprises an installing part on which the plurality of the artifacts are installed, said mount surface being provided by the installing part, wherein the mount surface and the installing part can be at least, inclined, moved, rotated or lifted and lowered integrally relative to the table main body.

10. The mount table according to claim 1, wherein the plurality of artifacts extend laterally from the table main body.

11. The mount table according to claim 10, wherein the mount table has a plurality of sides, and wherein each of said plurality of sides has some of said plurality of artifacts extending therefrom.

12. A surface texture measuring machine comprising:
    a base having a flat upper surface defining a surface plate;
    a detector having a measuring member for measuring a workpiece;
    a detector support mechanism for supporting the detector for movement relative to the base;
    a measuring device for measuring at least a position or an angle of the detector; and
    a mount table that is mounted on the base, said mount table comprising:
      a table main body having a mount surface on which the workpiece to be measured or worked is mounted,
      a support unit disposed between the table main body and the surface plate that supports the table main body so as to permit the table main body to float above the surface plate and freely move in X and Y planes and rotate about a Z axis on the surface plate during positioning of the workpiece into a prescribed attitude and wherein, when the workpiece is at the prescribed attitude, the support unit causes the table main body to suck onto the surface plate and thereby prevent movement in the X and Y planes and prevent rotation about the Z axis so as to permit measurement or working of the workpiece at the prescribed attitude, and
      a plurality of artifacts for measuring a plurality of attitudes of the mount table, wherein the plurality of the artifacts are directly provided on the mount table main body and extend outwardly therefrom.

13. The surface texture measuring machine according to claim 12, wherein in each of the plurality of attitudes of the mount table, the detector measures the artifacts, measures the workpiece as required and collects measured results.

14. The surface texture measuring machine according to claim 13, further comprising:
    a data processor for respectively calculating the attitudes of the mount table relative to the base on the basis of the measured results of the artifacts, and connecting the measured results of the workpiece collected respectively in the attitudes on the basis of the calculated results of the attitudes of the mount table to form an integrated measured result.

15. A surface texture measuring method using a surface texture measuring machine, said surface measuring machine comprising:
- a base having a flat upper surface serving as a surface plate;
- a detector having a measuring member for measuring a workpiece;
- a detector support mechanism for supporting the detector for movement relative to the base;
- a measuring device for measuring at least a position or an angle of the detector; and
- a mount table that is mounted to the base, said mount table comprising:
  - a table main body having a mount surface on which a workpiece to be measured or worked is mounted,
  - a support unit disposed between the table main body and the surface plate that supports the table main body to permit the table main body to float above the surface plate and freely move in X and Y planes and rotate about a Z axis on the surface plate during positioning of the workpiece into a prescribed attitude and wherein, when the workpiece is at the prescribed attitude, the support unit causes the table main body to suck onto the surface plate and thereby prevent movement in the X and Y planes and prevent rotation about the Z axis so as to permit measurement or working of the workpiece at the prescribed attitude, and
  - a plurality of artifacts for measuring a plurality of attitudes of the mount table, wherein the plurality of the artifacts are directly provided on the table main body and extend outwardly therefrom said surface texture measuring method comprising the steps of:
- a positioning step of moving and rotating the table main body on which the workpiece is mounted, about the base in X and Y planes and about a Z axis to position the table main body at the prescribed attitude;
- a fixing step of fixing the table main body to the base at the prescribed attitude by sucking the table main body onto the base;
- an artifact measuring step of measuring the plurality of artifacts that can be measured at the prescribed attitude to collect artifact measured data;
- a workpiece measuring step of collecting the workpiece measured data of the workpiece at the prescribed attitude, as required;
- a repeating step of repeating the positioning step, the fixing step, the artifact measuring step and the workpiece measuring step, as required;
- an attitude calculating step of calculating respectively the attitudes of the table main body relative to the base on the basis of the artifact measured data; and
- a workpiece measured data integrating step of connecting the workpiece measured data collected respectively in the attitudes on the basis of the calculated results of the attitudes of the mount table to form an integrated measured result.

16. The surface texture measuring method according to claim 15, wherein the positioning step includes floating the mount table relative to the base by operation of the supporting unit, moving or rotating the floating mount table so that the mount table is placed at the prescribed attitude, and, when the mount table is in the prescribed attitude, sucking the mount table on the base by operation of the supporting unit.

* * * * *